Riddell & Allen,
Nutmeg Grater.

N° 59,266. Patented Oct. 30, 1866.

Witnesses:
J. H. Adams
D. G. Haskins

Inventors
John Riddell
Boyd Allen

UNITED STATES PATENT OFFICE.

JOHN RIDDELL AND BOYD ALLEN, OF BOSTON, MASSACHUSETTS.

IMPROVED NUTMEG-GRATER.

Specification forming part of Letters Patent No. 59,266, dated October 30, 1866; antedated October 18, 1866.

*To all whom it may concern:*

Be it known that we, JOHN RIDDELL and BOYD ALLEN, natives of England, at present residing in Boston, in the county of Suffolk and State of Massachusetts, have invented a new and useful Improvement in Nutmeg-Graters; and we do hereby declare that the following is a full, clear, and exact description of the same, reference being had to the accompanying drawings, making a part of this specification, in which—

Figure 1:
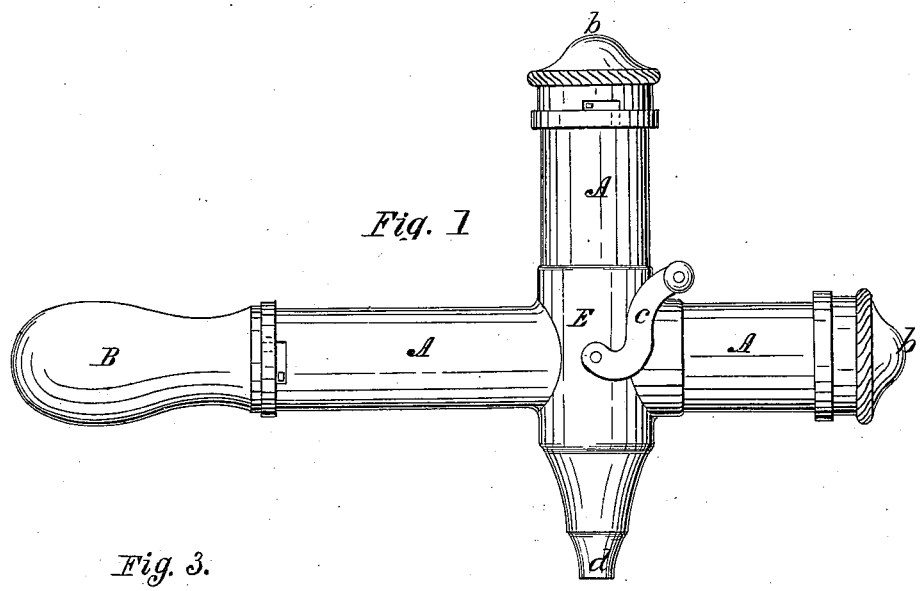
Figure 3:
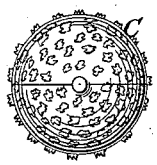
Figure 2:
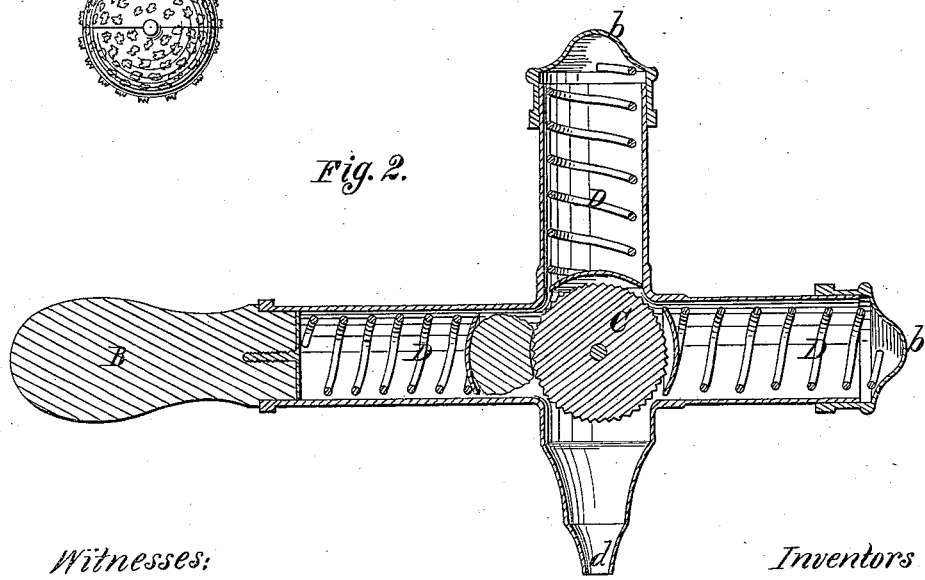

Figure 1 represents a side elevation. Fig. 2 is a longitudinal section, and Fig. 3 is a view of the spherical grater.

Our invention consists in the employment of a spherical grater placed within a casing, and operated by a crank or handle on the outside, and also in attaching to the casing two or more cylindrical chambers, for the purpose of grating two or more nutmegs at one and the same time.

In the drawings, E represents a central casing or chamber, in which is journaled so as to be easily rotated a spherical grater, C, having a roughened surface, and made either hollow or solid. It is made preferably hollow, as the two halves can be easily struck up from a sheet of metal and joined together at the center.

The shaft which supports the grater is provided with a handle or crank, c, by which it is rotated.

Upon either side of the chamber E, and also on the upper part, is attached a cylindrical chamber, A, in one of which is fitted a handle, B, by which the device is held. In each of these chambers A is a coiled spring, attached to the handle in one chamber and to caps or heads in the others at one end, and having at the other end a circular metal plate, which rests against the nutmeg, being pressed by the spring when the nutmeg is grated.

The handle and caps or heads are secured to the ends of the cylindrical chambers by a slot and pin, or by any other convenient means, so as to allow of its being readily detached.

It will thus be seen that with this instrument three or more nutmegs can be grated at the same time, and if it is desirable to increase its capacity, other cylindrical chambers may be attached to the casing E, the same being placed between the chambers A above and below.

In hotels or other places where nutmegs are used in large quantities, this device will effect a great saving of time and labor.

Having thus described our invention, what we claim, and desire to secure by Letters Patent, is—

1. The spherical grater C, arranged within the casing or chamber E, and operating as and for the purpose specified.

2. The combination of the spherical grater C with the casing E and chambers A, as and for the purpose specified.

In testimony whereof we have signed our names to this specification in the presence of two subscribing witnesses.

JOHN RIDDELL.
BOYD ALLEN.

Witnesses:
J. H. ADAMS,
D. G. HASKINS.